Aug. 22, 1933.     T. J. ERDMAN     1,923,259
GRAIN DRILL
Filed July 10, 1930     5 Sheets-Sheet 1

Witness
Milton Lenoir

Inventor
Theodore J. Erdman
By Brown, Jackson, Boettcher & Dienner
Attorneys.

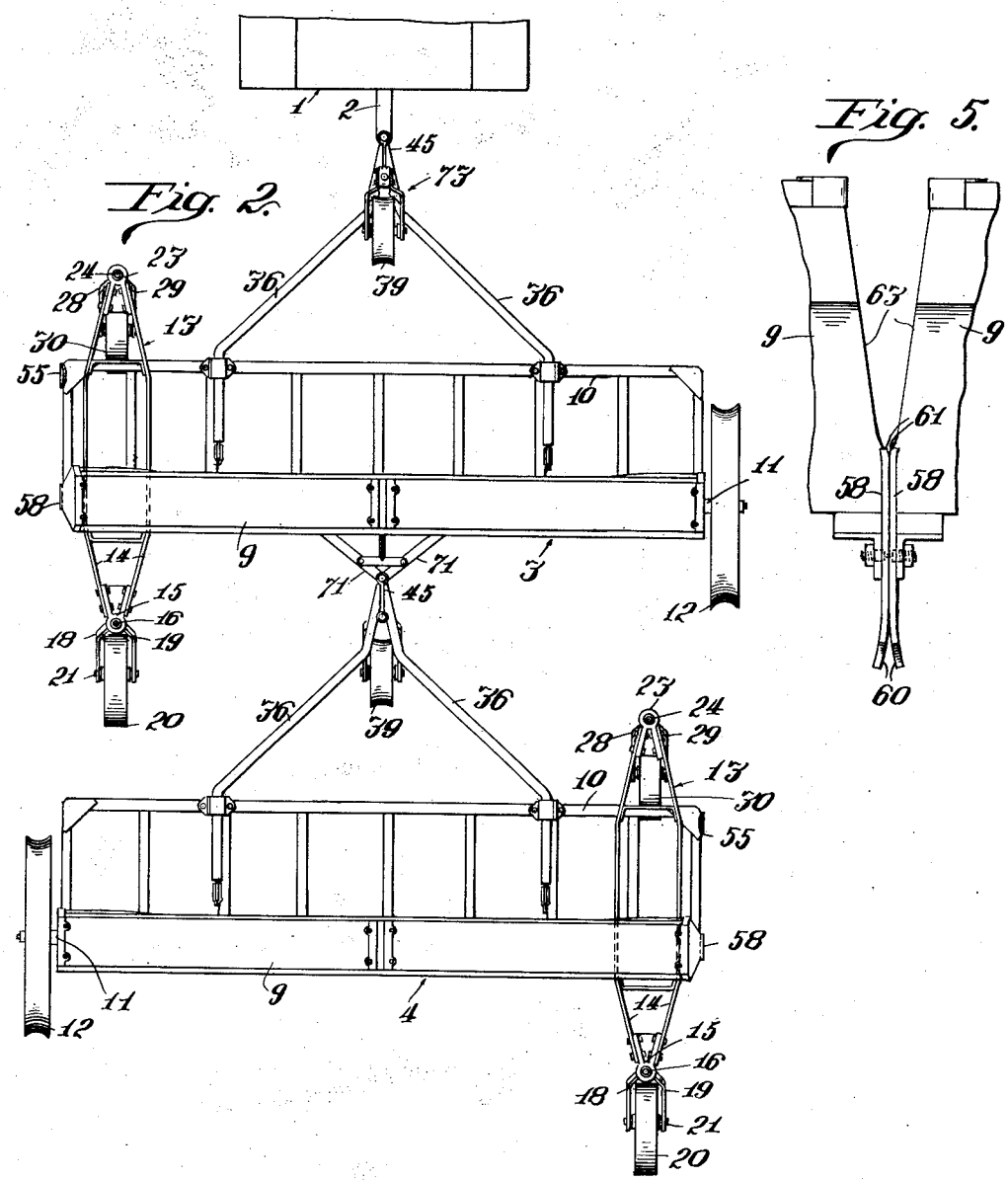

Aug. 22, 1933.  T. J. ERDMAN  1,923,259
GRAIN DRILL
Filed July 10, 1930  5 Sheets-Sheet 3
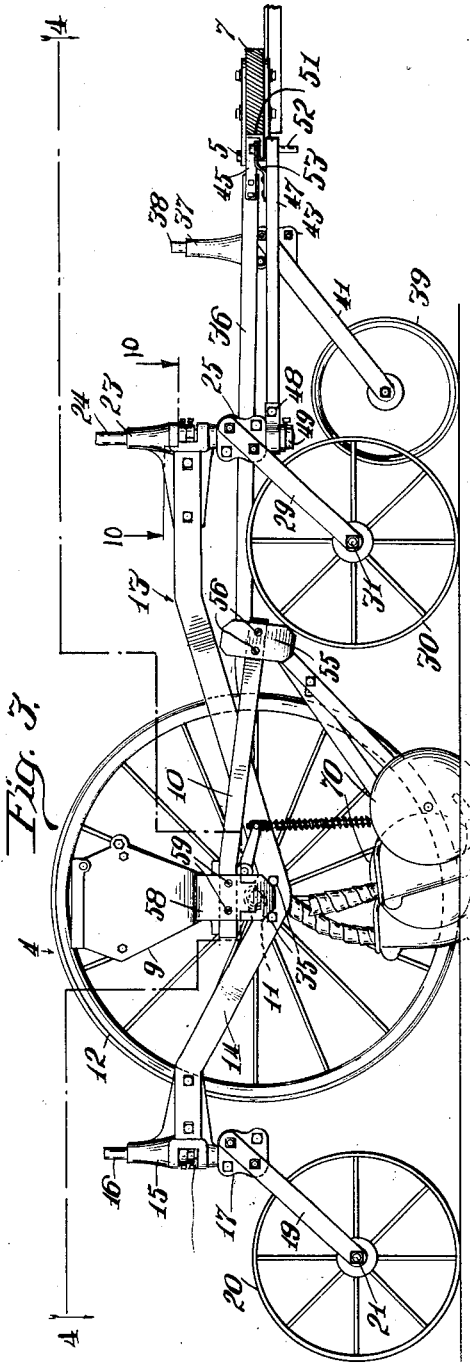
Witness
Milton Lenoir
Inventor
Theodore J. Erdman
By Brown, Jackson, Boettcher & Dienner
Attorneys.

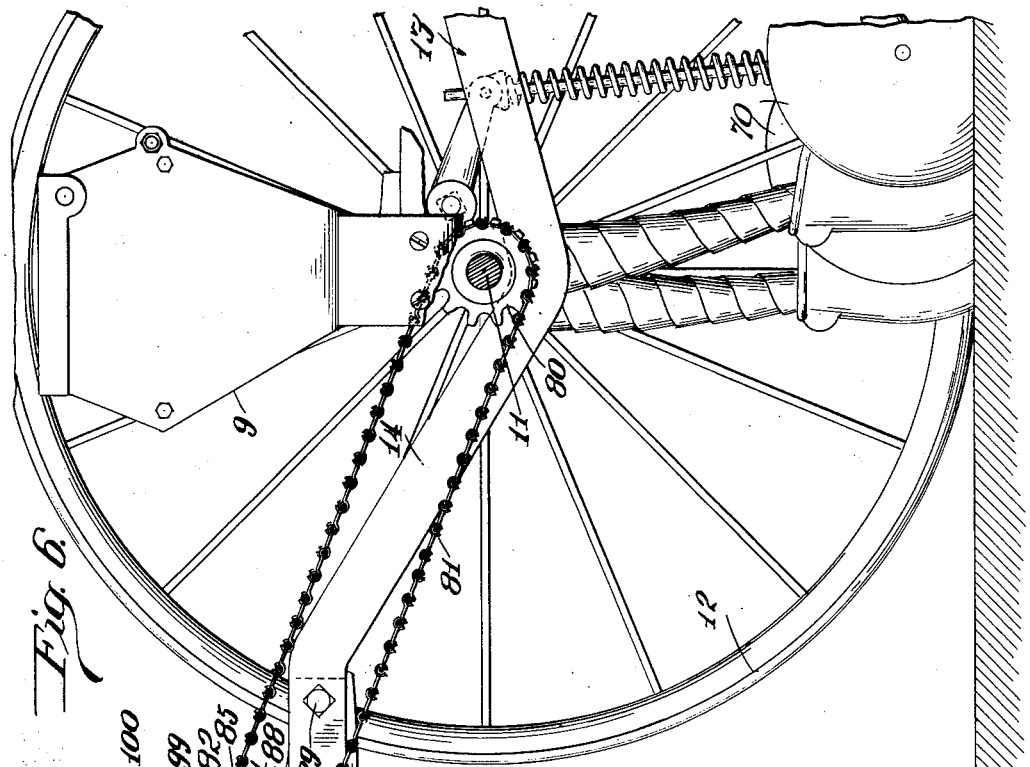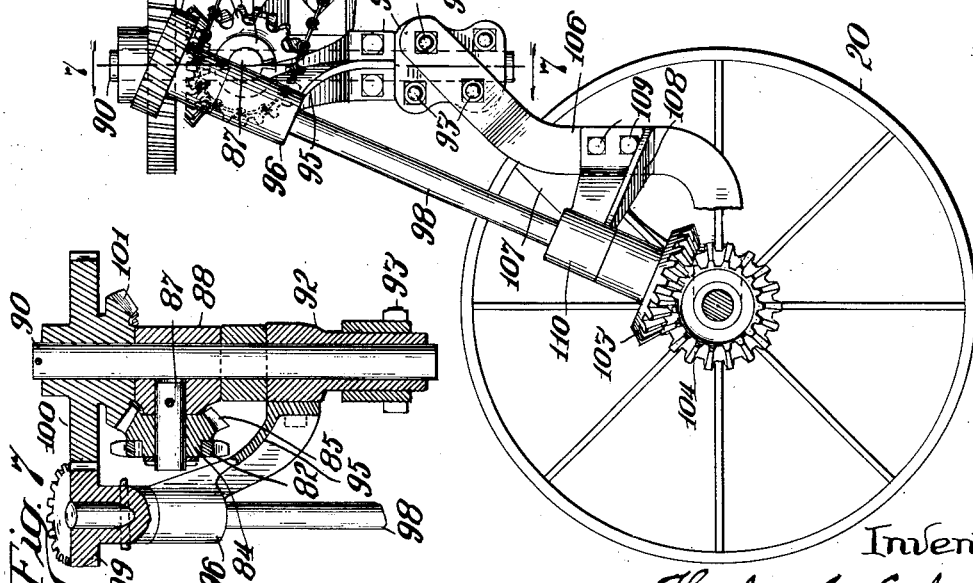

Aug. 22, 1933.  T. J. ERDMAN  1,923,259
GRAIN DRILL
Filed July 10, 1930   5 Sheets-Sheet 5

WITNESS
Walter Ackerman

INVENTOR
Theodore J. Erdman
BY Brown, Jackson,
Böttcher & Diemer
ATTORNEYS

Patented Aug. 22, 1933

1,923,259

UNITED STATES PATENT OFFICE 1,923,259

GRAIN DRILL

Theodore J. Erdman, Horicon, Wis., assignor to Van Brunt Manufacturing Company, Horicon, Wis., a Corporation of Wisconsin Application July 10, 1930. Serial No. 467,034

37 Claims. (Cl. 111—52)

The present invention relates generally to agricultural implements and particularly to those implements adapted to sow grain or other small seed by depositing the same in a plurality of rows in a continuous operation.

More specifically, the present invention relates to an improved form of grain drill or like implement which is so arranged and constructed that a number of such implements may be positioned in transverse alignment so that a wider strip may be planted at each trip.

The farm tractors of the present perfected type usually found on up to date farms today are adapted for a wide plurality of uses. As a rule, such tractors have sufficient power to pull two or more implements of the kind which previously were used singly on account of the fact that it was not feasible to attach the required number of horses or other draft animals to pull a plurality of such implements. This is particularly true in the case of grain drills for sowing wheat or other small grain. A single grain drill is not adapted for tractor propulsion for the reason that it is too light a load for efficient operation and while two or more of such drills may be hitched behind a tractor it is usually necessary to arrange them in staggered relation in order to have the seeded strips meet. This necessitated a more or less complicated form of hitch connection which is not always satisfactory in operation.

One object, therefore, of my invention is the provision of an improved drill which is so constructed and arranged that a number of them can be positioned in transverse alignment so that the seeded strips lie in contiguous relationship, the drills being flexibly and independently supported so that when transporting the same they can be easily arranged in tandem. While it is known to provide a number of drill sections flexibly connected together for movement about a longitudinal horizontal axis, such implements have not proven entirely satisfactory for the reason that, so far as I am aware, the sections could not be conveniently arranged for transporting in tandem or one behind the other.

Briefly, my invention consists of so supporting each drill section that it is supported independently of any other section while still being capable of being brought together close enough so that the seeded strips lie as close together as the customary spacing between each row. My invention also contemplates an improved hitch means whereby the drill sections or units may be easily and quickly arranged for either transverse alignment or for transportation in tandem relation.

Another object of my invention is the provision of improved means for supporting the inner ends of adjacent drill sections, which supporting means is spaced from the adjacent ends so that the ends may be brought into abutting relationship, which supporting means may also include driving connections by which a portion of the seeding mechanism may be driven from the supporting wheels on that side of the drill. My invention also contemplates the provision of improved connecting means for propelling the drill units in transverse alignment in such a manner that each drill unit is adapted for both vertical and angular movement with respect to the adjoining units, these connections being so arranged, however, that all of the units normally operate in end to end abutting relation so that no portion of the ground traversed fails to receive the proper amount of seed.

Still further, another object of my invention is the provision of improved means for supporting one end of a drill so that it may be used advantageously in either tandem or transverse aligned relation with other drills, said supporting means allowing the drill to follow undulations of the ground without affecting its efficacy when operating on a hillside.

Other objects and advantages of my invention will be apparent to those skilled in the art after a consideration of the following detailed description taken in conjunction with the accompanying drawings, in which:

Figure 2 is a similar view showing the two drill sections arranged in tandem for transporting them from one field to another;

Figure 3 is a side elevation showing on a somewhat larger scale my improved supporting means for the inner ends of the drill sections;

Figure 4 is a top view of the section illustrated in Figure 3 showing some parts in section and others in elevation, the view being taken substantially along the line 4—4 of Figure 3;

Figure 5 is an enlarged fragmentary view showing the abutting inner ends of two adjacent drill units;

Figure 6 is an enlarged view showing my improved supporting means for the inner ends of the drill units and which is modified so as to include driving connections between one of the supporting wheels for the inner end of the drill unit by which a portion or all of the seeding mechanism may be driven;

Figure 7 is a cross-sectional view taken substantially along the line 7—7 of Figure 6;

Figure 1:
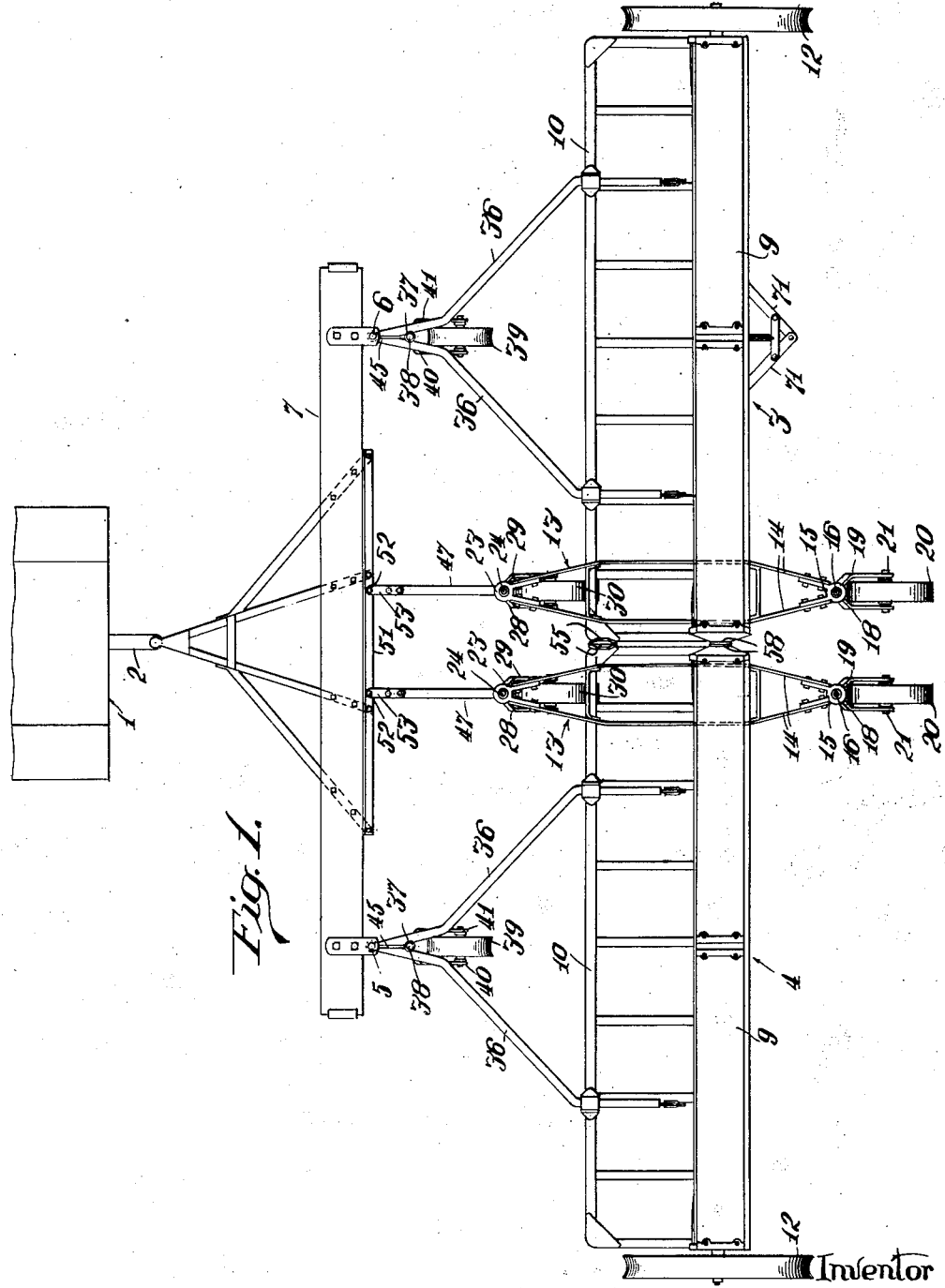
Figure 1 is a plan view of one embodiment of my invention and which shows two drill sections being pulled by one tractor and in transverse alignment.

Referring now to the drawings, the reference numeral 1 indicates the tractor having a drawbar 2 of the usual type. It is to be understood, however, that my invention is not to be limited to use with a tractor, inasmuch as any other form of draft means may be utilized as convenient or desirable. As illustrated in Figure 1, right and left drill units 3 and 4 are pivotally connected at points 5 and 6 to a common draft member 7 so as to operate in lateral or transverse alignment. Unit 3 comprises a seed box 9 mounted on a framework 10 which is carried on a through axle 11. The axle 11 is supported on its outer end beyond the framework 10 by means of a single wheel 12, and on its inner end the axle 11 is carried on a truck 13 positioned inside the end of the framework 10. The unit 4 comprises the same parts and is supported in the same way so that a description of the unit 4 is not believed to be necessary, particularly since parts of unit 4 which are identical with parts of unit 3 are indicated by the same reference numerals.

Each of the trucks 13 comprises a pair of frame bars 14, see Figure 4, the bars 14 converging both forwardly and rearwardly. At the rearward point of convergence the bars 14 are connected to a casting 15 which has a vertical boring or journal in which is rotatably received the spindle member 16. The spindle member 16 includes an attaching member 17 clamped to the lower end of the spindle proper, and forked members 18 and 19 are bolted to the attaching member 17 so as to extend downwardly and rearwardly, there being at their lower ends a caster wheel 20 supported therein as by bearing means 21.

At their forward ends these beam members 14 converge and terminate in a casting 23 similar to or identical with the casting 15. The casting 23 also has a vertical boring or journal in which a spindle 24 is received, the spindle 24 supporting at its lower end an attaching member 25 similar to the attaching member 17 described above. Forked members 28 and 29 extend downwardly and rearwardly from the attaching member 25 and at their lower ends the forked members are connected to a supporting wheel 30 by bearing means 31. A pair of journal castings 33 and 34 are bolted, as by bolts 35, to each of the trucks 13, a journal casting being secured to each of the frame bars 14. The axle or shaft 11 upon which the seed box 9 is carried is rotatably supported upon the truck 13 by the journal castings 33 and 34 just described.

The casting 15 has a horizontal slot 15a exposing the spindle 24 and providing a pair of vertical shoulders 15b and 15c. A pair of collars 16a and 16b are adjustably clamped to the spindle 24, as by cap screws, and each collar has a lug 16c extending outwardly for cooperative engagement with one of the shoulders 15b and 15c. These lugs limit the castering movement of the caster wheel in both directions, and the collars may be adjusted so that the caster wheel may be locked against any castering movement, if desired. This is the position illustrated in Figure 10. It is to be understood, of course, that the collars may be adjusted on the spindle to allow it to turn in the casting 15 to the extent desired. When drilling on a steep hillside it may be necessary to lock the caster wheels against any castering movement, and this may be accomplished when necessary by merely loosening the cap screws and shifting the stop collars to the required position.

Figure 10:
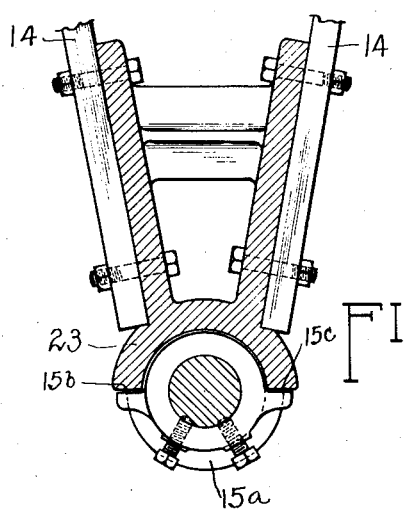
Figure 10 is a cross section taken substantially on the line 10—10 of Figure 3 showing the means for limiting the castering of the caster wheels.

This construction may be simplified by providing, instead of two stop collars, a single stop collar having two lugs approximately 150° apart and adjustably fixed to the spindle 24 by means of a cap screw similar to those shown in Figures 3 and 10. With the use of a single stop collar the caster wheels may be locked against castering movement in one direction by bringing the lug thereon on the side on which castering movement is to be prevented against the adjacent shoulder of the casting 23.

A pair of forwardly converging draft members 36 are connected to the frame 10 by any suitable means, and the forward ends of the draft members 36 are connected to a casting 37 in which the spindle 38 of a caster wheel 39 is journaled. The caster wheel 39 is connected to the spindle 38 by forked members 40 and 41, which are similar to the forked members 28 and 29, and an attaching member 43 which is similar to the attaching members 17 and 25 described above. At their forward ends these draft members 36 are connected to a clevis 45 which is pivotally connected to the draft member 7 by means of a bolt 5. The frame 10 of the other drill unit is connected to the common draft member 7 by the same means. It will thus be observed that the two drilled units are pivotally connected to the common draft member 7, but the units are restained from pivoting about the points 5 and 6 and are held in a position of transverse or lateral alignment by links 47 which, as shown in Figure 1, extend from each of the trucks 13 forwardly to a point of connection with the common draft member 7.

As best shown in Figure 3, the links 47 are pivotally connected by means of a bolt 48 to a collar 49 which is fixed on the lower extending portion of the spindle 24 or the attaching member 25. The collar 49 is rotatably secured to the spindle 24 or the attaching member 25 so that the swinging of the caster wheel 30 does not affect the operation of the links 47. Each of the links 47 is connected at its forward end to a rear reenforcing angle iron 51 by means of a pin 52. A strap 53 may be provided on the forward end of each of the links 47 and having an offset portion spaced above the link 47 so as to lie above the member 51 as best shown in Figure 3. This form of construction makes for ease and convenience in attaching the draft member 7 to the drill units.

By reason of its connection to the draft member 7 by means of bolts 5 and 6 and the links 47, each drill unit is held up in line and is restrained against rotational movement in a horizontal plane with respect to the draft member 7. Each unit is, however, capable of vertical bodily movement relative to the draft member 7. At their inner ends each drill unit is provided with a bumper plate 55 bolted to the frame 10 by means of bolts 56. The inner ends of the seed box of each drill unit is also provided with a bumper plate 58 secured thereto as by bolts 59. The bumper plates on one unit are in abutting engagement with the corresponding bumper plates on the other unit so as to transmit side thrusts of one unit against the other unit, yet permit each unit to move bodily vertically or assume angular positions with respect to a horizontal plane independently of the other unit. Bumper plates 58 are flared outwardly at the bottom, as shown at 60 in Figure 5, and also at the top as shown at 61. The seed boxes 9 at their inner ends are inclined upwardly and outwardly as shown at 63 in Figure 5 to permit angular movement of one unit with respect to the other.

The connection of the drill units to the draft member 7 which is effected by the bolts 5 and 6 and the pins 52 is such that a limited amount of angular movement in a vertical plane of the drill units 3 and 4 is permitted. To aid the drill units in maintaining their abutting engagement, all of the discs of each unit are angled in the direction to give that unit a tendency to crowd toward the other unit.

As shown in Figure 1 the drill units 3 and 4 are arranged in transverse alignment and are connected to be drawn by a draft means 1. By virtue of the fact that the trucks 13 are mounted at a distance from the abutting inner ends of each drill unit the two units are supported close enough together to space these two inner end discs 70 substantially the same distance apart as the distance between the adjacent discs of the unit, as best shown in Figure 4.

To transport the drill the draft beam 7 is disconnected by removing the bolts 5 and 6 and removing the links 47 from the collars 49 by removing the bolts 48. The tractor 1 is then connected to the clevis 45 of drill unit 3 which carries at its rear links 71 as shown in Figure 1. The drill unit 4 is connected to the links 71 as shown in Figure 4 so as to occupy a position substantially behind the drill unit 3. The caster wheel 39 of unit 3 is removed from the casting 37 and is replaced bottom side up in this same casting, as shown at 73 in Figure 2, so that the weight of the front end of the unit 3 is carried on the drawbar 2 of the tractor. It is possible, however, to leave the caster wheel 29 for unit 3 in operating position providing a separate clevis is used to connect the unit 3 with the drawbar of the tractor with sufficient looseness in the joint to permit flexing in a vertical plane. The caster wheel 39 for unit 4 is preferably left in operating position by providing sufficient looseness in the connection between the clevis 45 for that unit and the links 71.

In the construction described above the axle 11 was stated to be a through axle so that the power for driving the seed selecting mechanism may be derived from the one outside wheel. In the usual construction of a drill unit, however, the shaft or axle for the seed selecting mechanism is divided into two sections at the middle, each section being driven by the end wheel upon which it is supported. In some cases it may be desirable to provide such a drill unit to take the place of the drill units 3 and 4 described above. For this purpose I have devised a modified form of truck construction which supports the ends of the drill units but which is spaced from the ends so that the units may occupy positions against one another, the truck being designed, however, that a driving connection is had between one of the supporting wheels and the shaft or axle section for that end of the drill unit. One such a modified form of truck construction is illustrated in Figures 5 and 6. The inner axle section, indicated by the reference numeral 11, is provided with a sprocket 80 having a chain 81 trained thereover and extending rearwardly to a point where the rear bight of the chain 81 is received by a sprocket 82 keyed on the reduced portion 84 of the hub of a bevel gear 85, best shown in Figure 7. The bevel gear 85 is journaled on a stub shaft 87 which is secured in a laterally extending position to the casting 88 bolted by bolts 89 to the rear ends of the steam bars 14. A spindle 90 is journaled in the casing 88 and at the lower end of the spindle 90 an attaching member 92 is bolted, as shown in Figure 7, as by bolts 93. A bracket 95 is also bolted to the attaching member 92 and the bracket 95 extends outwardly and upwardly where it is provided with a journal 96 axially inclined downwardly and rearwardly as best shown in Figure 6. A shaft 98 is journaled in the portion 96 and as a spiral gear 99 secured thereto by a pin 100. The gear 99 meshes with a gear 100 journaled on the upper end of the spindle 90 and which is provided with a set of bevel keys 101 which mesh with the keys of the bevel gear 85. The lower end of the shaft 98 is provided with a bevel gear 103 which is adapted to mesh with a bevel gear 104 secured to one of the supporting wheels 20 of the truck 13. The wheel 20 is mounted for rotation between port members 106 and 107 which are bolted to the attaching member 92 and one of which is provided with an offset portion to which a bracket 108 is secured, as by bolts 109. The bracket 108 has a journaled portion 110 which receives the lower end of the shaft 98, the journal portions 96 and 110 being arranged between the gear members 99 and 104 so that the shaft 98 is restrained from longitudinal displacement therein. As will be clear from Figure 7 the spindle member 90 and the attaching member 92 together with the bracket 95 and the forked members 106 and 107 are free to swing about the vertical axis of the spindle 90 in the casting 88 to allow the wheel 20 to caster in the usual manner. Rotation of the wheel 20 is, however, transmitted by the gears 103 and 104 through the shaft 98 and the gears 99 and 100 to the bevel gears 101 and 85. Rotation of the gear member 85 rotates the sprocket 82 which in turn through the chain 81 drives the sprocket 80 and the shaft 11. The other shaft section may be driven by the supporting wheel 12 in the usual manner, or if desired a truck unit 13 like the one just described may be mounted at the other end of the drill unit so that the unit is supported and driven by wheeled supporting means at either end thereof, both supporting means being spaced from the ends thereof. By using units of this type a drill may be built up of any number of separate units and more than two, the number shown in Figures 1 and 2. These units, which may be termed intermediate units, may have such a supporting and driving truck unit 13 at either end or the shaft 11 may be a through shaft in which case only one of the truck units 13 need be provided with driving means.

Attention is directed to the fact that each drill unit is provided with its own supporting and driving means whereby each unit is a separate and complete drill in itself. This is an important feature in that under difficult operating conditions or under other situations it is entirely possible to operate with only one drill unit. As an example, the operator may desire to use only one drill unit when finishing a narrow strip at the end of the field, thus making it unnecessary to pull the two drill units in such cases.

Where more than two drill units are operated at the same time it is necessary that all but one of them be provided with rearwardly extending links such as shown indicated by the reference numeral 71 in Figures 1 and 2. This is necessary because when arranged in tandem relation the units are arranged so that the one forward pulls all the units to the rear.

Figure 8:
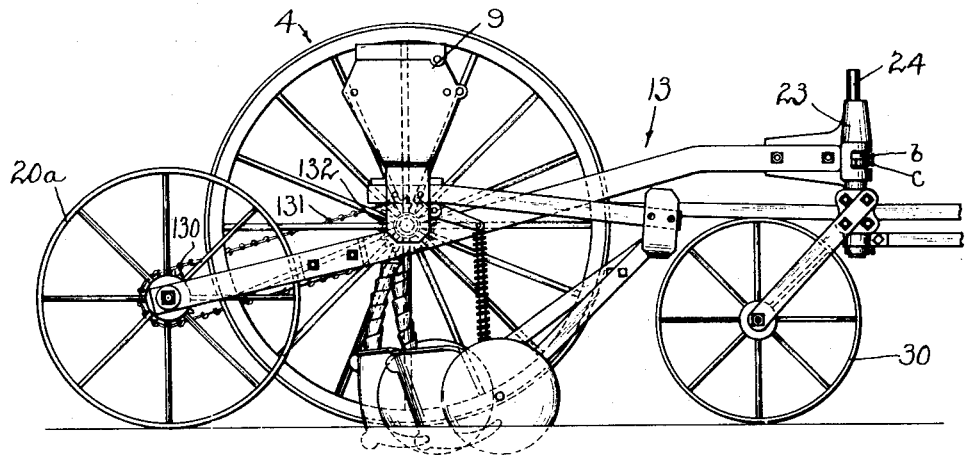
Figure 8 is an end view illustrating one embodiment of my improved supporting means for one end of a drill section.
Figure 9:
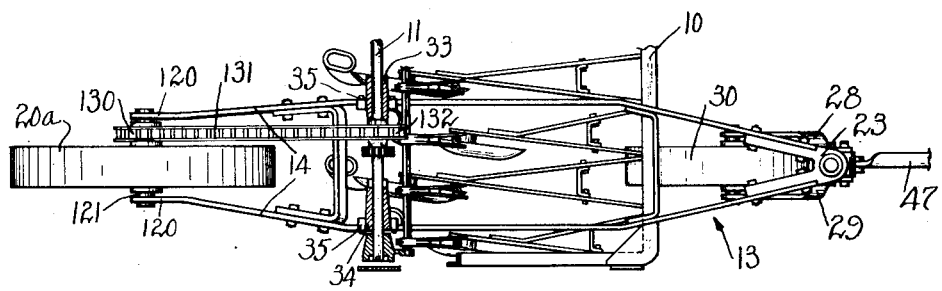
Figure 9 is a top view of the support shown in Figure 8.

While I have shown in Figures 3 and 4 the preferred embodiment of my invention as including two caster wheels on my improved supporting truck for the inner ends of the drill units or sections, this construction is not absolutely essential in that it is not absolutely necessary to support each end of the two wheeled truck on a caster wheel. One of the wheels for the truck 13 may be rigid with the frame 14, if desired. In Figures 8 and 9 I have shown by way of example the rear wheel 20a of the truck 13 as rigid with the frame 14, that is, capable of no castering movement relative thereto. This wheel 20a is somewhat larger than the rear wheel 20 of the embodiment illustrated in Figure 3 and is brought in closer to the drill. In this modification the frame members 14 are formed substantially straight from the first bend in rear of the front wheel structure 30. As in the modification illustrated in Figures 3 and 4, the frame members 14 are spaced apart a substantial amount underneath the framework 10 of the drill unit. The rear ends of the frame members 14 are brought close together and the extreme portions thereof are formed so as to extend substantially mutually parallel, as indicated by the reference numeral 120 in Figure 9. These parallel portions 120 of the frame members 14 receive the journal 121 upon which the rear wheel 20a is journaled. This wheel, it will be noted, cannot caster and the purpose for bringing this wheel 20a close to the drill and close to the axle 11 is for the purpose of allowing the drill to turn readily, as at corners and the like. With the two drills provided with the supporting means shown in Figure 8 and connected together as shown in Figure 1, the turning radius of the drill at the inner end is relatively large, even though the drill be turned about one of the outer wheels 12. Therefore, even though wheel 20a is not exactly in line with the wheels 12, there is substantially no skidding of either of the rear wheels 20a of the two drill units. Furthermore, when each section of the drill is used alone, there is very little skidding of the wheels 20a even when turning in the direction toward the end of the drill section supported on the two wheeled truck 13.

A sprocket 130 is mounted on wheel 20a and a chain 131 trained thereover extends forwardly where its forward bight is trained over a sprocket 132 secured to the axle section 11 thus the rear non-castering wheel 20a may be used to drive the drill section associated therewith.

While I have described in connection with the accompanying drawings one preferred embodiment of my invention it is to be understood that my invention is not to be limited to the specific means shown and described but that, in fact, widely different means may be employed in the practice of the broader aspects of my invention.

What I claim, therefore, and desire to secure by Letters Patent is:

1. An agricultural implement comprising a plurality of separate units, closely spaced seed dropping means on each unit; draft connections for said units adapting them to be positioned in transverse alignment for operation and in tandem alignment for transporting, and supporting means for each unit spaced from the end of the unit so that when the units are in transverse alignment the seed dropping means of one unit is closely adjacent the seed dropping means of the other unit.

2. A drill comprising two sections, each having draft connections by which the sections may be propelled in abutting transverse alignment for operation, said sections being independently movable vertically, said connections being arranged for connecting the drills in tandem relation for transporting.

3. A drill comprising a pair of drill units adapted to be positioned in transverse alignment for operation, and wheeled supporting means for each unit including a supporting wheel spaced outwardly from the adjacent inner end of each unit whereby the units may have abutting relation when in operation.

4. A drill comprising a pair of drill units adapted to be positioned in transverse alignment for operation, and wheeled supporting means for each unit including a driving wheel at the outer end and a supporting wheel near the inner end spaced therefrom a distance to allow the units to abut one another when in operation, each unit being vertically movable independently of the other.

5. A drill comprising a pair of drill units adapted to be positioned in transverse alignment for operation, and wheeled supporting means for each unit including a driving wheel at the outer end and a two-wheeled truck at the inner end, and a bumper plate on the inner end of each unit whereby it may have abutting engagement with the other drill unit and each unit may move vertically independently of the other.

6. A drill comprising a plurality of drilling units flexibly connected together for operation in transverse alignment, separate supporting means for each unit, whereby said units may be arranged in abutting relation, and buffer means between abutting ends of said units.

7. A drill comprising a plurality of drilling units flexibly connected together for operation in transverse alignment and each including a plurality of closely spaced seed depositing means and separate supporting and driving means for each unit, whereby said units may be arranged in tandem, said supporting and driving means including wheel means connected to the units to permit them to operate in abutting relation with the seed depositing means of one unit adjacent the seed depositing means of the other unit.

8. A drill comprising a pair of drill units adapted to be positioned in transverse alignment for operation, and wheeled supporting means for each unit including a driving wheel at the outer end and a two-wheeled truck at the inner end, one wheel of said truck having driving connections to cooperate with the driving wheel to actuate each drilling unit, the truck for each unit being spaced from the inner end thereof to permit the units to operate in abutting relation, and draft connections by which the units may be propelled.

9. A drill comprising a plurality of drilling units adapted to be flexibly connected for operation in transverse abutting alignment, bumper plates mounted on the abutting portions of the units, said plates restraining the relative lateral movement of said units but permitting relative vertical movement whereby the units may conform to uneven contour of the ground surface, and wheel supporting and driving means for supporting and driving each unit independently of the other units.

10. A drill comprising a plurality of drilling units, seed boxes having inclined ends and adapted to be flexibly connected for operation in transverse abutting alignment, bumper plates mounted on the abutting portions of the units, said plates restraining the relative lateral movement of said units but permitting relative vertical movement whereby the units may conform to uneven contour of the ground surface, said inclined ends permitting the units to take various angular position, and wheel supporting and driving means for the units.

11. A drill unit comprising a seeding mechanism, a driving wheel mounted at one end of the unit for supporting and driving the same, a truck including a longitudinally extending beam having a caster wheel at each end for supporting the other end of said unit, means mounting the unit on said wheel and truck for oscillatory movement relatively thereto, and a draft tongue secured to the unit and extending forward to a point substantially central with respect to the drill.

12. A drill unit comprising a seeding mechanism, including a transverse drive shaft therefor, means for supporting one end of the unit comprising a driving wheel mounted at one end of the unit for supporting and driving the same, means for supporting the other end of the unit comprising, a truck including a longitudinally extending beam having a caster wheel at each end, said beam comprising a pair of spaced members having a bearing support for said shaft, and a draft tongue secured to the unit and extending forward to a point substantially central with respect to the drill.

13. A drill comprising a pair of drill units, each unit comprising a frame, supporting means for one end of the frame, supporting means for the other end of the frame including a pair of fore and aft extending members having their ends arranged in converging relationship, vertical journal means connected to said converged ends, a caster wheel having a spindle mounted in each journal means, means pivoting the frame to said members, and forwardly extending draft means connected to said frame.

14. A drill unit comprising a frame, supporting means for the ends of the frame, said means including a pair of fore and aft extending members having their ends arranged in converging relationship, vertical journal means connected to said converged ends, a caster wheel having a spindle mounted in each journal means, means pivoting the frame to said members, forwardly extending draft means connected to the frame and including a vertical journal and a caster wheel having a spindle mounted in the vertical journal for supporting the draft means, and draft connections extending from said vertical journal to a point transversely opposite the forward converged ends of said members.

15. A drill unit comprising a frame, a seeding mechanism, means for supporting one portion of the frame, means for supporting the other portion of the frame including a longitudinally extending beam, caster wheels at either end of the beam, and driving connections between one of said wheels and the seeding mechanism.

16. A drill unit comprising a frame, a seeding mechanism, means for supporting and driving the unit including supporting means for one end of the frame, a longitudinally extending beam adjacent the other end of the frame, caster wheels at either end of the beam, and driving connections between one of said wheels and the seeding mechanism, including a driving sprocket and chain and gear means for actuating the driving sprocket.

17. A drill unit comprising a frame, a seeding mechanism on the frame and having a transverse seeding shaft journaled therein, means for supporting one end of the frame, means for supporting the other end of the frame including a longitudinally extending beam having spaced apart members and journal means receiving said shaft, caster wheels journaled at either end of said beam, a gear on one of said wheels, a rearwardly extending shaft movably supported with said caster wheel and driving connections between said rearwardly extending shaft and the seeding shaft.

18. In a drill unit, the combination of a frame, mounting means for one end thereof, including a fore and aft extending member having at one end a castering wheel and at the other end a non-castering wheel, driving means for the drill associated with one of said wheels, and means for supporting the other end of said frame.

19. In a grain drill, a frame and supporting means therefor including a single wheel at one end and a two-wheeled truck at the other end, one of the wheels of said truck being a castering wheel, and means for driving the drill from the other of said truck wheels.

20. A drill unit mounted at one end on a driving wheel having connection with the seeding mechanism for driving the latter, and mounted at the other on a truck comprising a longitudinally extending beam having a caster wheel at each end, the drill unit being mounted thereon to have oscillatory movement with respect thereto, and a draft tongue therefor having a pivotal connecting point substantially in the center of the drill.

21. A drill comprising two independent drill units positioned in transverse alinement, each unit being supported on a driving wheel at the outer end and a two-wheeled truck on its inner end, and each drill unit having at its inner end a bumper plate whereby it may have abutting engagement with the other drill unit and each unit may move vertically independently of the other.

22. A drill unit comprising a main frame, a supporting wheel therefor at one end of said frame, supporting means for the other end of said frame including a fore and aft extending member pivotally connected with the frame to rock about a transverse axis with respect thereto and supporting wheels near the ends of said fore and aft extending member, and a draft member connected with the main frame and with said fore and aft extending member.

23. In a drill unit, the combination of a main frame, supporting means for one end of the main frame, supporting means for the other end of the main frame comprising a fore and aft extending member pivotally connected with the main frame to rock about a transverse axis with respect thereto and having at one end a castering wheel and a second wheel at its other end, a draft member connected with the main frame, a draft link connected with the forward end of said fore and aft extending member, and a transverse hitch bar connected with said draft member and said draft link.

24. A grain drill comprising a plurality of drill units, each of said units including a main frame and supporting means therefor comprising a two-wheeled truck having a fore and aft extending member connected with the main frame of the unit, forwardly extending draft means connected with the main frame of each unit, forwardly extending draft links connected with the forward end of each of said two-wheeled trucks, and a draft bar connected with each of said draft means and draft links.

25. In a grain drill, a frame and supporting means therefor including a single wheel at one end and a two-wheeled truck at the other end, the latter including a fore and aft extending frame, the frame of the drill extending over the truck frame.

26. A grain drill comprising a main frame, a plurality of seed depositing means carried by said frame, and supporting means for the frame including a two-wheeled truck having longitudinally spaced apart supporting wheels, certain of said seed depositing means being positioned substantially in line with said wheels.

27. A drilling unit comprising a main frame, a plurality of seed depositing means carried by said frame, and supporting means for the frame including a single wheel at one end and a two-wheeled truck at the other end, said truck including a fore and aft extending frame member and a pair of longitudinally spaced supporting wheels, one of the wheels being a castering wheel and certain of the seed depositing means being positioned in line with the supporting wheels of the truck.

28. A drilling unit comprising a frame, seed depositing means carried by said frame, and supporting means for the frame including a single wheel at one end and a two-wheeled truck at the other end, said truck being spaced from the end of the frame so that the latter projects thereover, certain of the seed depositing means being in line with the wheels of said truck, one of said wheels serving to drive the seed depositing means.

29. A grain drill unit comprising a main frame, a plurality of seed depositing means carried thereby, supporting means for the frame including a two-wheeled truck spaced inwardly of the drill unit and away from the end of the main frame, forwardly converging draft means connected with the main frame, and a caster wheel supporting the forward end of said draft means.

30. A grain drill unit comprising a main frame, a plurality of seed depositing means carried thereby, supporting means for the frame including a two-wheeled truck spaced inwardly of the drill unit and away from the end of the main frame, means pivotally connecting said truck with the main frame, draft means connected with the main frame, and a caster wheel supporting the forward end of said draft means.

31. A grain drill comprising a frame, seed depositing means carried thereby, and supporting means therefor including a single wheel at one end and a two-wheeled truck at the other end, one of the wheels of said truck being a castering wheel, said truck including a frame having spaced apart longitudinal members, certain of said seed depositing means occupying a position between said members.

32. A grain drill comprising a pair of drill units, each of said units including a frame and supporting means therefor including a single wheel at one end of the frame and a two-wheeled truck at the other end of the frame, said units being arranged in transverse alignment with the ends of the units supported by the two-wheeled trucks adjacent one another.

33. An agricultural machine comprising, in combination, a drill unit including a frame and supporting means therefor consisting of a single wheel at one end and a two-wheeled truck at the other end, and a second implement arranged adjacent the end of the drill supported by the two-wheeled truck, said implement having supporting means including a single wheel at one end and a two-wheeled truck at the other end adjacent the two-wheeled truck of the drill unit.

34. An agricultural machine comprising a plurality of implement units, each of said units including a main frame and supporting means therefor, the supporting means for one end of the frame comprising a two-wheeled truck having a fore and aft extending member connected with the frame of the units, forwardly extending draft means connected with the main frame of each unit, forwardly extending draft links connected with the forward end of each of the two-wheeled trucks, and a draft beam carried by said draft means and connected with each of said draft links.

35. An agricultural machine comprising, in combination, a tractor having a draw bar, a plurality of implement units arranged in transverse alignment and each of said units including a main frame and supporting means therefor, the supporting means for one end of the frame comprising a wheel supported fore and aft extending member connected with the main frame of the units, forwardly extending draft means connected with the main frame of each unit, a transverse draft beam connected with and carried by said forwardly extending draft means of the units and the draw bar of the tractor, and separate draft links connecting the draft beam with the forward end of each of said fore and aft extending members.

36. A drill comprising a pair of drill units, each having a plurality of furrow openers, said units being adapted to be positioned in transverse alignment for operation, and wheeled supporting means for each unit including supporting means for the outer end thereof, and a supporting wheel spaced outwardly from the transverse vertical plane of the adjacent inner furrow openers, whereby the adjacent inner furrow openers may be disposed in closely spaced relation when in operation.

37. A drill comprising a pair of drill units adapted to be positioned in transverse alignment for operation, each of said units including a plurality of laterally spaced furrow openers, and wheeled supporting means for each unit including a driving wheel at the outer end and a supporting wheel disposed in a plane laterally outwardly of the innermost furrow openers to allow the adjacent furrow openers of the units to be disposed in closely spaced relation when the units are in operation, each unit being vertically movable independently of the other.

THEODORE J. ERDMAN.